(12) United States Patent
Haber

(10) Patent No.: US 9,031,980 B2
(45) Date of Patent: May 12, 2015

(54) METRIC GATHERING AND REPORTING SYSTEM FOR IDENTIFYING DATABASE PERFORMANCE AND THROUGHPUT PROBLEMS

(71) Applicant: Wayne Haber, Alpharetta, GA (US)

(72) Inventor: Wayne Haber, Alpharetta, GA (US)

(73) Assignee: Dell Products, LP, Round Rock, TX (US)

( * ) Notice: Subject to any disclaimer, the term of this patent is extended or adjusted under 35 U.S.C. 154(b) by 169 days.

(21) Appl. No.: 13/646,341

(22) Filed: Oct. 5, 2012

(65) Prior Publication Data

US 2014/0101200 A1 Apr. 10, 2014

(51) Int. Cl.
*G06F 17/30* (2006.01)

(52) U.S. Cl.
CPC .... *G06F 17/30306* (2013.01); *G06F 17/30557* (2013.01)

(58) Field of Classification Search
CPC .......... G06F 17/3056; G06F 17/30404; G06F 17/30554; G06F 17/30445; G06F 11/3466; G06F 17/30442; G06F 17/30463; G06F 17/3048; G06F 17/30935; G06F 17/30938
USPC ....................................................... 707/774
See application file for complete search history.

(56) References Cited

U.S. PATENT DOCUMENTS

| | | | |
|---|---|---|---|
| 5,960,196 A | 9/1999 | Carrier, III et al. | |
| 6,466,391 B1 * | 10/2002 | Lee et al. | 360/75 |
| 7,925,665 B2 * | 4/2011 | Schneider et al. | 707/774 |
| 8,135,702 B2 * | 3/2012 | Burger et al. | 707/718 |
| 8,341,178 B2 * | 12/2012 | Belknap et al. | 707/769 |
| 2003/0014350 A1 | 1/2003 | Duell et al. | |
| 2004/0030672 A1 | 2/2004 | Garwin | |
| 2007/0198471 A1 * | 8/2007 | Schneider et al. | 707/3 |
| 2009/0019147 A1 | 1/2009 | Ahlers et al. | |
| 2010/0010379 A1 * | 1/2010 | De Rossi et al. | 600/587 |
| 2010/0030730 A1 * | 2/2010 | Shang et al. | 707/2 |
| 2010/0106708 A1 * | 4/2010 | Burger et al. | 707/713 |
| 2011/0161310 A1 * | 6/2011 | Tang et al. | 707/714 |

* cited by examiner

*Primary Examiner* — Debbie Le
(74) *Attorney, Agent, or Firm* — Larson Newman, LLP

(57) ABSTRACT

A database back end system includes a monitoring server operable to poll a first database for a first query running on the first database and add the first query to a query list in a second database, and a reporting server operable to normalize the first query, analyze the second database to find a second query in the query list, wherein the second query is found based upon the normalized first query, and report the second query to a user, wherein the reporting is based upon the analyzing of the second database to find the second query.

20 Claims, 4 Drawing Sheets

METRIC GATHERING AND REPORTING SYSTEM FOR IDENTIFYING DATABASE PERFORMANCE AND THROUGHPUT PROBLEMS

FIELD OF THE DISCLOSURE

This disclosure relates generally to information handling systems, and relates more particularly to re-provisioning servers in a data center.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

A database system normally includes an organization of collected data, referred to as the database, and an associated package of programs referred to as the database management system (DBMS), for creating, maintaining, manipulating, and using the database. Users of the database system interact with the database via the DBMS to make queries to the database. The performance, availability, and throughput of the database system can depend on the nature of the queries.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion focuses on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Figure 1:
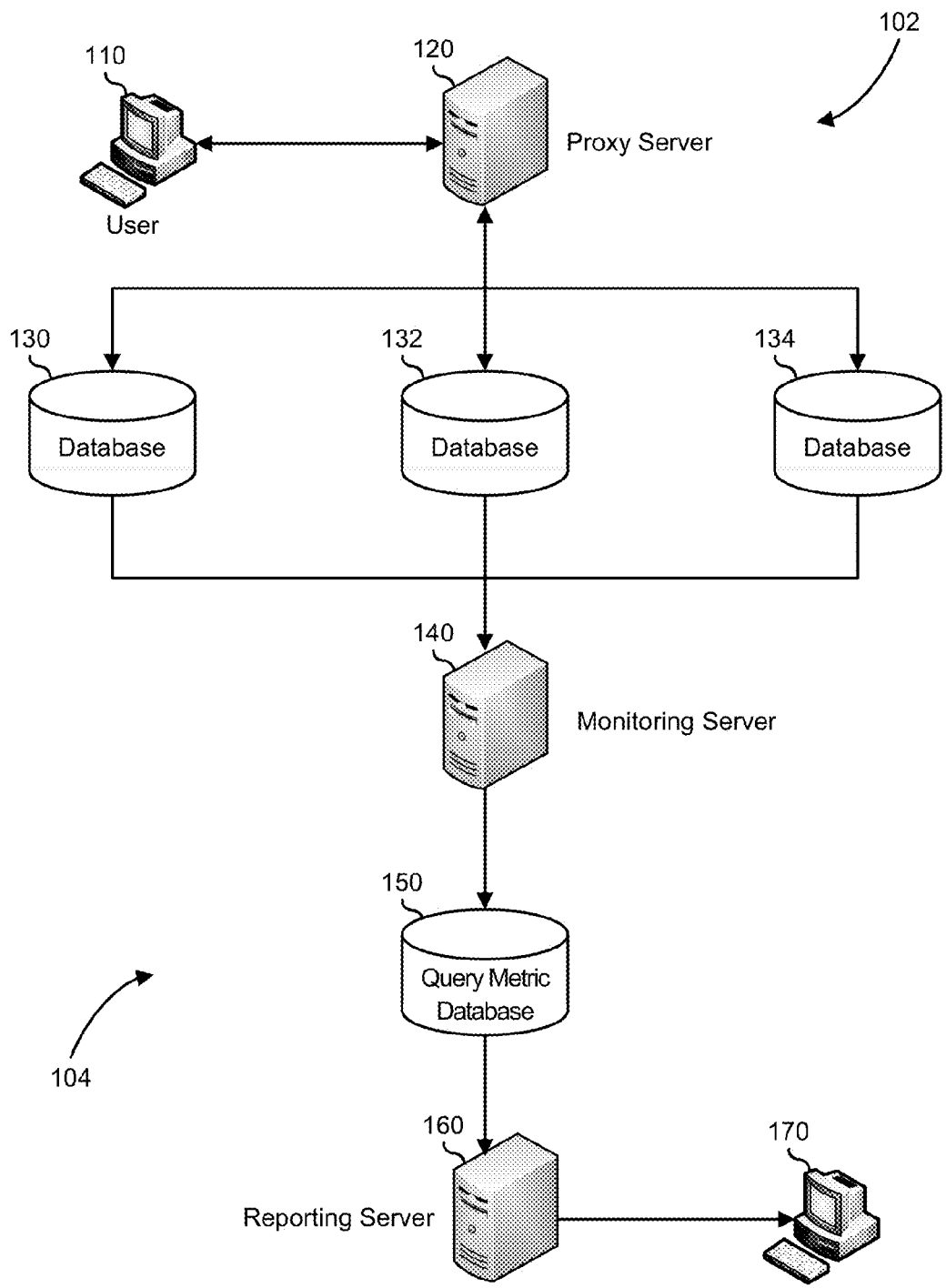
FIG. 1 is a block diagram of a database system according to an embodiment of the present disclosure.

FIG. 1 shows a database system 100 that includes a database front end 102 and a database back end 104. Database front end 102 includes one or more database users 110, a database proxy server 120 and databases 130, 132, and 134. Database back end 104 includes databases 130, 132, and 134, a monitoring server 140, a query metric database 150, a reporting server 160, and a report user 170. Database front end 102 represents enabled database services for a particular enterprise or group of enterprises, such that databases 130, 132, and 134 each provide logically grouped data that is accessible to users 110 via proxy server 120. As such, database front end 102 can represent various operational capabilities for an enterprise such as an airline or hotel reservation system, a manufacturing production system, a banking system, another enterprise system, or a combination thereof. For example, where database front end 102 represents an airline reservation system, database 130 can represent a flight schedule database, database 132 can represent a flight pricing database, and database 134 can represent a passenger reservation database. Here, user 110 can request a flight reservation through a web interface, a customer service call center, or the like. The request can be sent to proxy server 120 that can provide one or more queries to databases 130, 132, and 134, receive responses to the queries, and provide a reservation to user 110 based upon the available flight schedules, pricing, and seat availability, as provided by the databases.

Databases 130, 132, and 134 can be maintained by one or more associated DBMS. In a particular embodiment, databases 130, 132, and 134 represent one or more commercial database systems that can provide query responses in a standard format, such as a structured query language (SQL), an application programming interface (API), a graphical user interface (GUI), or another standard format. As such, proxy server 120 can include one or more DBMS and can receive requests from user 110 and coordinate queries in one or more of databases 130, 132, and 134 in order to satisfy the request. Thus, databases 130, 132, and 134 can format the data residing in the databases in accordance with the associated DBMS. An example DBMS includes Microsoft Access, Microsoft SQL Server, MySQL, Oracle, SQLite, Sybase SQL, or another DBMS as needed or desired.

Database back end 104 represents maintenance and management services for database front end 102, and particularly for databases 130, 132, and 134. In particular, database back end 104 provides metric gathering and reporting for database system 100 for identifying database performance and throughput problems. As such, monitoring server 140 operates to poll databases 130, 132, and 134 to determine the active queries on the databases, and to store a list of the queries in query metric database 150. Monitoring server 140 interacts directly with databases 130, 132, and 134 to obtain query activities of the databases as the queries are being processed, and without the overhead of requesting the query activities through proxy server 120. Monitoring server 140 polls databases 130, 132, and 134 based upon various database log characteristics. For example, monitoring server 140 can poll databases 130, 132, and 134 based upon the site location of the databases, the logical address of the databases, a database query timestamp, a unique query identifier, a particular database user or host, a particular database command or query type, a query duration, a query state, or the like, as needed or desired. In particular, a query state can indicate that the query is a locker for an accessed portion of the database, that the query is a victim of a locked portion of the database, that the query is copying database entries to a temporary table, that the query is sending data to user 110 or writing the data to a network, that the query is sorting a result, or the like. The skilled artisan will understand that other characteristics and query statuses can for the basis by which monitoring server 140 polls databases 130, 132, and 134, as needed or desired.

In another embodiment, monitoring server 140 polls databases 130, 132, and 134 to retrieve all active queries, and stores the active queries on query metric database 150, such that over time the query metric database collects and lists all queries made to the databases. Monitoring server 140 can periodically poll databases 130, 132, and 134 to retrieve all active queries. For example, monitoring server 140 can poll databases 130, 132, and 134 once per minute, twice per minute, or based upon another periodic schedule, as needed or desired. In another example, monitoring server 140 can poll each of databases 130, 132, and 134 based upon different periodic schedules, as needed or desired.

Reporting server 160 performs analysis and evaluation on the queries listed in query metric database 150. For example, reporting server 160 can perform analysis on query metric database 150 based upon one or more query characteristic, such as analyzing queries by site location or logical address of the databases, by database query timestamp, by unique query identifier, by particular database user or host, by database command or query type, by query duration, by query state, or the like, as needed or desired. In a particular embodiment, reporting server 160 provides the analysis to report user 170 in a ranked list according to the analyzed characteristic. For example, reporting server 160 can provide a ranked list of the queries that take the longest time to perform on databases 130, 132, and 134, based upon the database query timestamp of the associated queries. In another embodiment, report server 160 can provide the analysis in a graphical format, such as a time distribution of queries with a particular characteristic or a Pareto chart of queries with different characteristics.

In a particular embodiment, reporting server 160 performs analysis and evaluation on normalizations of the queries listed in query metric database 150. For example, based upon an analysis of the queries listed in query metric database 150, reporting server 160 can determine that a particular query was performed a large number of times or took a long time to execute. Here reporting server 160 can analyze other similar queries by normalizing certain variables within the particular query and analyzing the resulting queries. For example, reporting server 160 can determine that the following query:

/*Database__130-database.system.net*/ select event_id, customer_id,timestamp from GlobalEvents WHERE !(status&1) AND !(status&2) ORDER BY time DESC is performed often from various users 110. Here, reporting server 160 normalizes the query by removing specific values from the query and replacing them with normalization values to create:

/*Database_(num)-database.system.net*/ select (columns) from GlobalEvents WHERE !(status&(num)) AND !(status&(num)) ORDER BY time DESC in order to find and analyze queries that are similar to the original query. Reporting server 160 can provide the normalized analysis to report user 170 in a ranked list, or in a graphical format.

In another embodiment, reporting server 160 performs load analysis on the queries listed in query metric database 150. Here, reporting server 160 operates to determine the queries and normalized queries that function to create large loads on databases 130, 132, and 134. In particular, an analysis of either the longest duration queries or the most common queries may not provide insight into the queries that are the sources of large loading of databases 130, 132, and 134. For example, a longest duration query may be run so infrequently that the actual loading on databases 130, 132, and 134 from running the longest duration query may be negligible. Similarly, a most common query may be executed so quickly that the actual loading on databases 130, 132, and 134 is low, in spite of the large number of times the query is processed. Thus reporting server 160 operates to provide a metric for combining the duration of a particular query with the number of times the query is processed to determine whether or not the query results in a large load to databases 130, 132, and 134.

TABLE 1

| | Database | | | |
|---|---|---|---|---|
| No. | Query | Frequency | Duration | % Load |
| 1 | SELECT (col.) from DB-130 WHERE!(status&(num)) | 10 | 7 | 70 |
| 2 | SELECT (col.) from DB-132 WHERE!(status&(num)) | 15 | 1 | 15 |
| 3 | SELECT (col.) from DB-136 WHERE!(status&(num)) | 1 | 15 | 15 |

Table 1 (above) illustrates an exemplary outcome of performing a load analysis. Note that an analysis of just duration of queries would indicate that query 3 is the longest running query. However, because query 3 is made only occasionally, query 3 only accounts for 15% of the database load. Similarly, an analysis of just the frequency of queries would indicate that query 2 is the most frequently called query, but because query 2 is a quick query, query 2 only accounts for another 15% of the database load. However when both the frequency and the duration of queries is analyzed, query 1 that is called an intermediate number of times and runs for an intermediate duration, nevertheless accounts for 70% of the database load.

Knowing this, a database administrator can take steps to either reduce the frequency at which query 1 is made, or to reduce the run time of query 1. For example, a further analysis of query 1 may indicate that a small group of non-normalized queries accounts for a large portion of the number of query calls, and that by caching those results at proxy server 120, the overall database load can be reduced. In the alternative, the database administrator can structure the database to shorten the duration of query 1.

In another embodiment, reporting server 160 performs lock analysis on the queries listed in query metric database 150. Here, reporting server 160 operates to determine the queries and normalized queries that function to lock portions of databases 130, 132, and 134, thereby limiting access by other queries to the locked portions of the databases. In a first aspect, reporting server 160 performs an analysis of the queries that are responsible for locking the databases. In a second aspect, reporting server 160 performs an analysis of the queries that are victims of the locks. Here, a database administrator can take steps to either reduce the number of locking queries, reduce the duration of the locking queries and thereby reduce the amount of time that the databases are locked, or reduce the number of subsequent queries that are victims of the locked queries.

Figure 2:
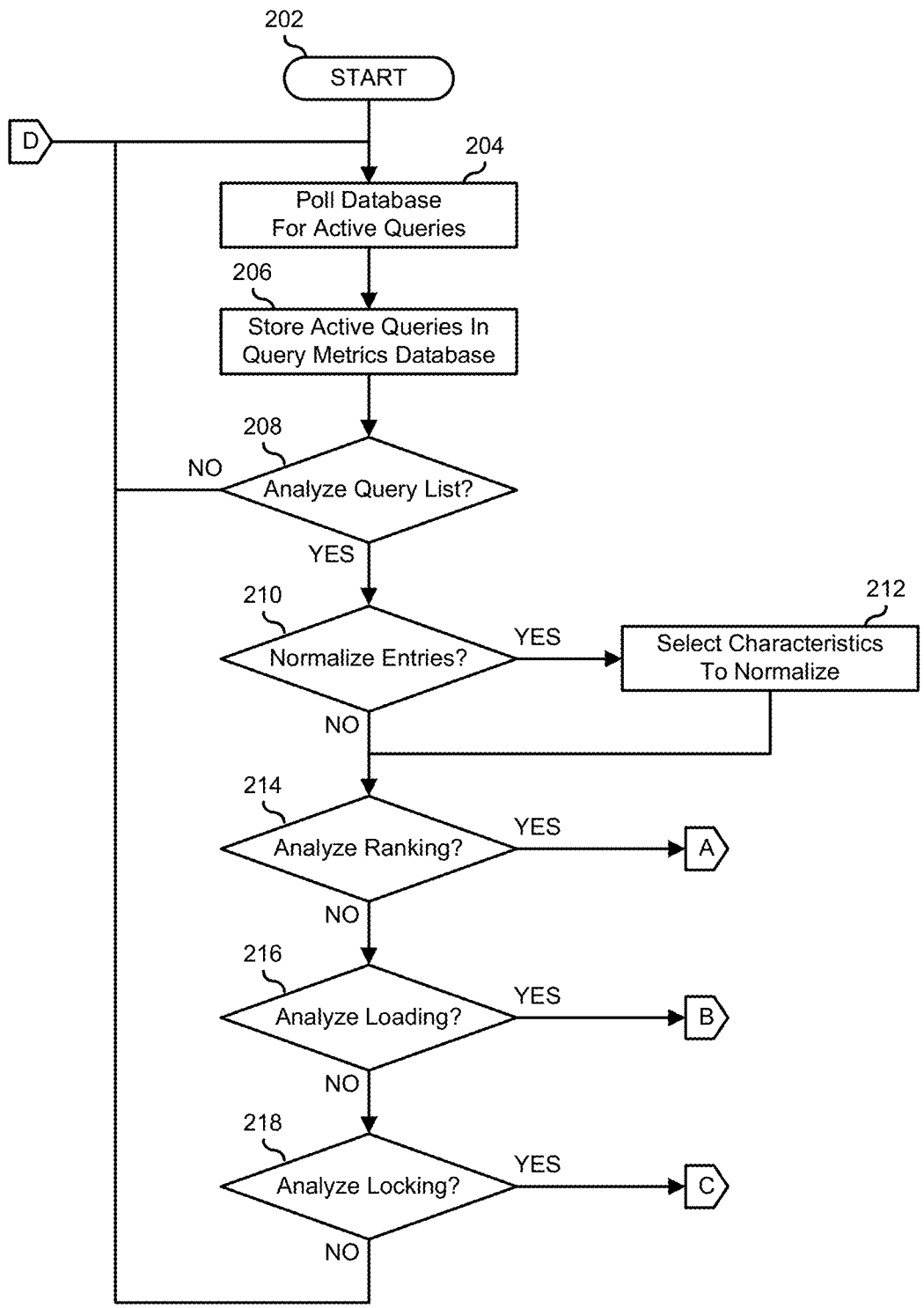
FIGS. 2 and 3 are flow diagrams of a method of metric gathering and reporting for identifying database performance and throughput problems according to an embodiment of the present disclosure.
Figure 3:
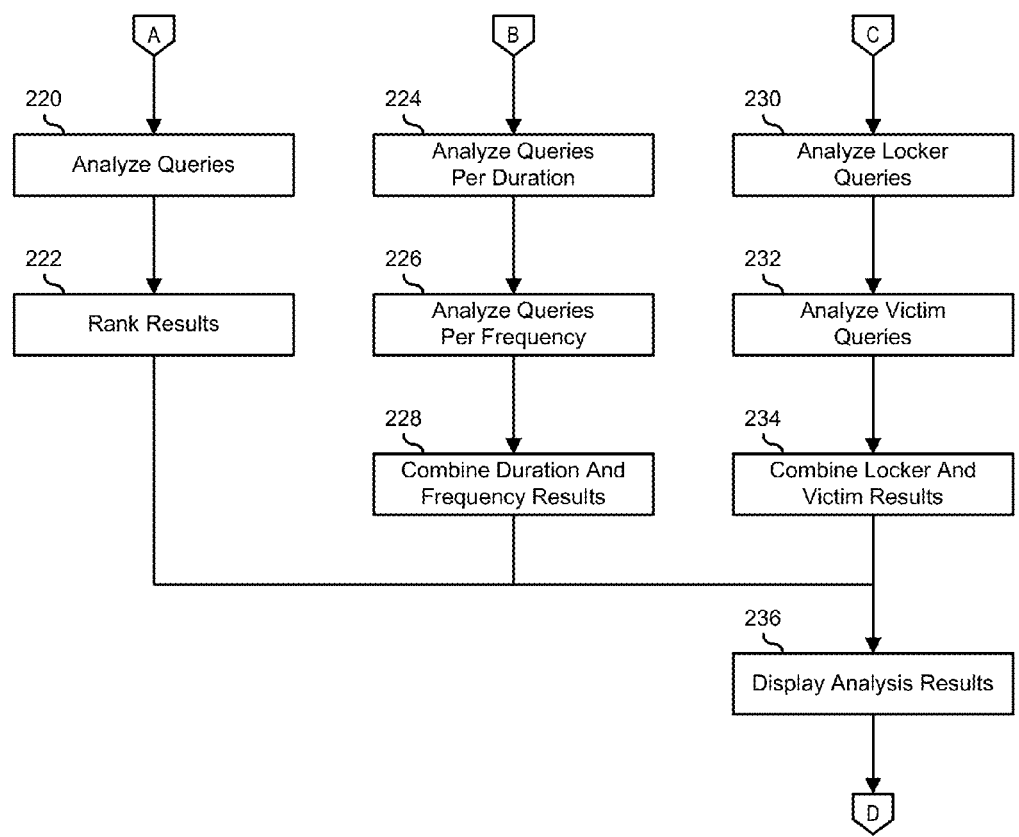

FIGS. 2 and 3 illustrate a method of metric gathering and reporting for identifying database performance and throughput problems starting at block 202. A database is polled for active queries in block 204. For example, reporting server 140 can poll databases 130, 132, and 134 for a list of the active queries being processed by the databases. The active queries are stored in a query metrics database in block 206. Here, reporting server 140 can receive the list of active queries from databases 130, 132, and 134, and can store the list in query metrics database 150. In a particular embodiment, reporting server 140 adds the list of active queries to an existing list in query metrics database 150. A decision is made as to whether or not the query list is to be analyzed in decision block 208. If not, the "NO" branch of decision block 208 is taken and the method returns to block 204 where the database is polled for newly active queries. If the query list is to be analyzed, the "YES" branch of decision block 208 is taken and a decision is made as to whether or not the analysis is to be based on normalized events from the query list in decision block 210. If not, the "NO" branch of decision block 210 is taken and the method proceeds to decision block 214, as described below.

If the analysis is to be based on normalized events from the query list, the "YES" branch of decision block 210 is taken, one or more characteristics from the queries of the query list are selected for normalization in block 212, and the method proceeds to block 214 where a decision is made as to whether or not the analysis is to be a ranking analysis of the entries of the query list. If not, the "NO" branch of decision block 214 is taken and the method proceeds to decision block 216, as described below. If the analysis is to be a ranking analysis of the entries of the query list, the "YES" branch of decision block 214 is taken and the queries list is analyzed in block 220. The results of the analysis of block 220 are ranked in block 222 and the results are displayed in block 236. For example, reporting server 160 can provide tabulated or graphical results of the analysis to report user 170. The method then returns to block 204 where the database is polled for newly active queries.

Returning to decision block 214, if the analysis is not to be a ranking analysis of the entries of the query list, the "NO" branch of decision block 214 is taken and a decision is made as to whether or not the analysis is to be a loading analysis of the entries of the query list in decision block 216. If not, the method proceeds to decision block 218, as described below. If the analysis is to be a loading analysis of the entries of the query list, the "YES" branch of decision block 216 is taken and the queries list is analyzed based upon the duration of the queries in block 224. The queries list is analyzed based upon frequency of the queries in block 226, and the duration and frequency analysis results are combined in block 228. For example, for a given query, the duration can be multiplied by the frequency to determine a database load. In another example, for another query, one or both of the duration and the frequency can be scaled and then multiplied together to determine a database load. In yet another example, the database load can be determined based upon another relationship between the frequency and the duration of a query, as needed or desired. The results of the analysis of blocks 224, 226, and 228 are displayed in block 236, and the method then returns to block 204.

Returning to decision block 216, if the analysis is not to be a loading analysis of the entries of the query list, the "NO" branch of decision block 216 is taken and a decision is made as to whether or not the analysis is to be a locking analysis of the entries of the query list in decision block 218. If not, the method proceeds to block 204 where the database is polled for newly active queries. If the analysis is to be a locking analysis of the entries of the query list, the "YES" branch of decision block 218 is taken and the queries list is analyzed based to determine the locking queries in block 230. The queries list is analyzed to determine the victims of the locking queries in block 232, and the locker and victim analysis results are combined in block 234. The results of the analysis of blocks 230, 232, and 234 are displayed in block 236, and the method then returns to block 204.

Figure 4:
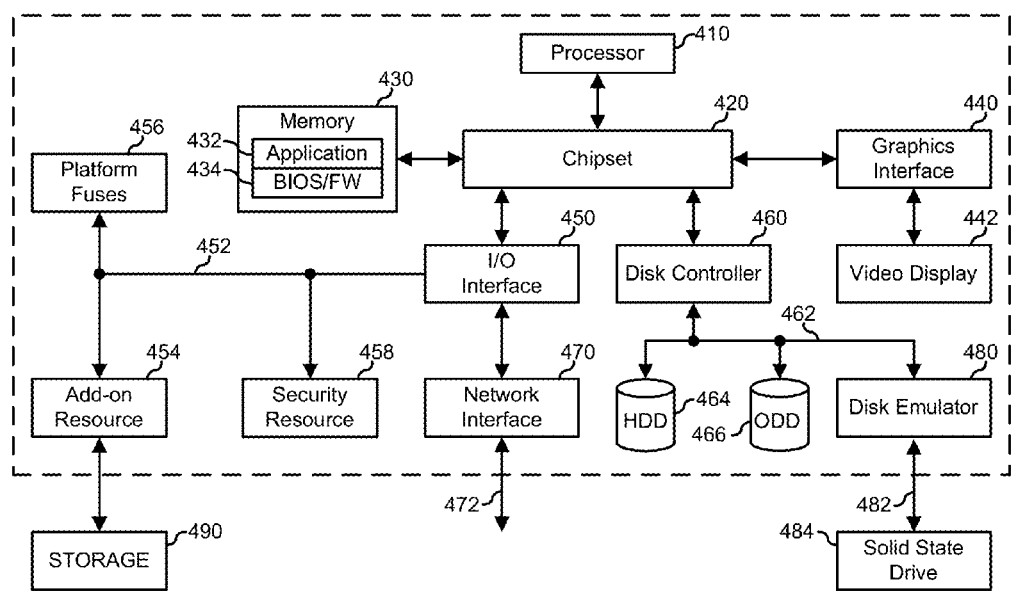
FIG. 4 is a functional block diagram illustrating an exemplary embodiment of an information handling system.

FIG. 4 illustrates an information handling system 400, including a processor 410, a chipset 420, a memory 430, a graphics interface 440, an input/output (I/O) interface 450, a disk controller 460, a network interface 470, and a disk emulator 480. In a particular embodiment, information handling system 400 is used to carry out one or more of the methods described herein. In another embodiment, one or more of the systems described herein are implemented in the form of information handling system 400.

Chipset 420 is connected to and supports processor 410, allowing the processor to execute machine-executable code. In a particular embodiment, information handling system 400 includes one or more additional processors, and chipset 420 supports the multiple processors, allowing for simultaneous processing by each of the processors and permitting the exchange of information among the processors and the other elements of the information handling system. Chipset 420 can be connected to processor 410 via a unique channel, or via a bus that shares information among the processor, the chipset, and other elements of information handling system 400.

Memory 430 is connected to chipset 420. Memory 430 and chipset 420 can be connected via a unique channel, or via a bus that shares information among the chipset, the memory, and other elements of information handling system 400. In another embodiment (not illustrated), processor 410 is connected to memory 430 via a unique channel. In another embodiment (not illustrated), information handling system 400 includes separate memory dedicated to each of the one or more additional processors. A non-limiting example of memory 430 includes static random access memory (SRAM), dynamic random access memory (DRAM), non-volatile random access memory (NVRAM), read only memory (ROM), flash memory, another type of memory, or any combination thereof.

Graphics interface 440 is connected to chipset 420. Graphics interface 440 and chipset 420 can be connected via a unique channel, or via a bus that shares information among the chipset, the graphics interface, and other elements of information handling system 400. Graphics interface 440 is connected to a video display 442. Other graphics interfaces (not illustrated) can also be used in addition to graphics interface 440 as needed or desired. Video display 442 includes one or more types of video displays, such as a flat panel display, another type of display device, or any combination thereof.

I/O interface 450 is connected to chipset 420. I/O interface 450 and chipset 420 can be connected via a unique channel, or via a bus that shares information among the chipset, the I/O interface, and other elements of information handling system 400. Other I/O interfaces (not illustrated) can also be used in addition to I/O interface 450 as needed or desired. I/O interface 450 is connected via an I/O interface 452 to one or more add-on resources 454. Add-on resource 454 is connected to a storage system 490, and can also include another data storage system, a graphics interface, a network interface card (NIC), a sound/video processing card, another suitable add-on resource or any combination thereof. I/O interface 450 is also connected via I/O interface 452 to one or more platform fuses 456 and to a security resource 458. Platform fuses 456 function to set or modify the functionality of information handling system 400 in hardware. Security resource 458 provides a secure cryptographic functionality and includes secure storage of cryptographic keys. A non-limiting example of security resource 458 includes a Unified Security Hub (USH), a Trusted Platform Module (TPM), a General Purpose Encryption (GPE) engine, another security resource, or a combination thereof.

Disk controller 460 is connected to chipset 420. Disk controller 460 and chipset 420 can be connected via a unique channel, or via a bus that shares information among the chipset, the disk controller, and other elements of information handling system 400. Other disk controllers (not illustrated) can also be used in addition to disk controller 460 as needed or desired. Disk controller 460 includes a disk interface 462. Disk controller 460 is connected to one or more disk drives via disk interface 462. Such disk drives include a hard disk drive (HDD) 464, and an optical disk drive (ODD) 466, and can include one or more disk drive as needed or desired. ODD 466 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 460 is connected to disk emulator 480. Disk emulator 480 permits a solid-state drive 484 to be coupled to information handling system 400 via an external interface 482. External interface 482 can include industry standard busses such as USB or IEEE 1394 (Firewire) or proprietary busses, or any combination thereof. Alternatively, solid-state drive 484 can be disposed within information handling system 400.

Network interface device 470 is connected to I/O interface 450. Network interface 470 and I/O interface 450 can be coupled via a unique channel, or via a bus that shares information among the I/O interface, the network interface, and other elements of information handling system 400. Other network interfaces (not illustrated) can also be used in addition to network interface 470 as needed or desired. Network interface 470 can be a network interface card (NIC) disposed within information handling system 400, on a main circuit board such as a baseboard, a motherboard, or any combination thereof, integrated onto another component such as chipset 420, in another suitable location, or any combination thereof. Network interface 470 includes a network channel 472 that provide interfaces between information handling system 400 and other devices (not illustrated) that are external to information handling system 400. Network interface 470 can also include additional network channels (not illustrated).

Information handling system 400 includes one or more application programs 432, and Basic Input/Output System and Firmware (BIOS/FW) code 434. BIOS/FW code 434 functions to initialize information handling system 400 on power up, to launch an operating system, and to manage input and output interactions between the operating system and the other elements of information handling system 400. In a particular embodiment, application programs 432 and BIOS/FW code 434 reside in memory 430, and include machine-executable code that is executed by processor 410 to perform various functions of information handling system 400. In another embodiment (not illustrated), application programs and BIOS/FW code reside in another storage medium of information handling system 400. For example, application programs and BIOS/FW code can reside in HDD 464, in a ROM (not illustrated) associated with information handling system 400, in an option-ROM (not illustrated) associated with various devices of information handling system 400, in storage system 490, in a storage system (not illustrated) associated with network channel 472, in another storage medium of information handling system 400, or a combination thereof. Application programs 432 and BIOS/FW code 434 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A database back end system comprising:
   a hardware monitoring server operable to:
      poll a first database for a first query running on the first database; and
      add the first query to a query list in a second database; and
   a hardware reporting server operable to:
      normalize a variable of the first query;
      analyze the second database to find a second query in the query list, wherein the second query is found based upon the normalized first query;
      report the second query to a user, wherein the reporting is based upon the analyzing of the second database to find the second query; and
      determine a first loading on the first database based upon a first frequency of occurrence of the second query and upon a first duration of the second query.

2. The database back end system of claim 1, wherein the monitoring server includes a first database management system that is associated with the first database.

3. The database back end system of claim 2, wherein the first database management system is separate from a second database management system that is associated with the first database, and that operates to issue the first query on the first database.

4. The database back end system of claim 1, wherein in normalizing the variable of the first query, the reporting server is further operable to:
   determine that a field of the first query includes a first value; and
   replace the first value with a variable.

5. The database back end system of claim 1, wherein the reporting server is further operable to:
   analyze the second database to find a third query in the query list; and
   report the third query to the user, wherein the reporting is based upon the analyzing of the second database to find the third query.

6. The database back end system of claim 5, wherein the reporting server is further operable to:
   rank the second and third queries based upon the first loading on the first database of the first query as compared to a second loading on the first database of the second query;
   wherein reporting the second and third queries are in response to the ranking.

7. The database back end system of claim 6, wherein the reporting server is further operable to:
   determine the second loading based upon a second frequency of occurrence of the third query and upon a second duration of the third query;
   wherein ranking the second and third queries is in response to determining the first and second loading.

8. The database back end system of claim 5, wherein the second query locks a portion of the first database and the third query is a victim of the second query.

9. A method comprising:
   polling by a hardware monitoring server a first database for a first query running on the first database;
   adding the first query to a query list in a second database;
   normalizing by a hardware reporting server a variable of the first query;
   analyzing the second database to find a second query in the query list, wherein the second query is found based upon the normalized first query;
   reporting the second query to a user, wherein the reporting is based upon the analyzing of the second database to find the second query; and
   determining a first loading on the first database based upon a first frequency of occurrence of the second query and upon a first duration of the second query.

10. The method of claim 9, wherein the monitoring server includes a first database management system that is associated with the first database.

11. The method of claim 10, wherein the first database management system is separate from a second database management system that is associated with the first database, and that operates to issue the first query on the first database.

12. The method of claim 9, wherein in normalizing the variable of the first query, the method further comprises:
   determining that a field of the first query includes a first value; and
   replacing the first value with a variable.

13. The method of claim 9, further comprising:
   analyzing the second database to find a third query in the query list; and
   reporting the third query to the user, wherein the reporting is based upon the analyzing of the second database to find the third query.

14. The method of claim 13, further comprising:
   ranking the second and third queries based upon the first loading on the first database of the first query as compared to a second loading on the first database of the second query;
   wherein reporting the second and third queries are in response to the ranking.

15. The method of claim 14, further comprising:
   determining the second loading based upon a second frequency of occurrence of the third query and upon a second duration of the third query;
   wherein ranking the second and third queries is in response to determining the first and second loading.

16. The method of claim 13, wherein the second query locks a portion of the first database and the third query is a victim of the second query.

17. A non-transitory computer-readable medium including code for performing a method, the method comprising:
- polling by a monitoring server a first database for a first query running on the first database;
- adding the first query to a query list in a second database;
- normalizing by a reporting server a variable of the first query;
- analyzing the second database to find a second query in the query list, wherein the second query is found based upon the normalized first query;
- reporting the second query to a user, wherein the reporting is based upon the analyzing of the second database to find the second query; and
- determining a first loading on the first database based upon a first frequency of occurrence of the second query and upon a first duration of the second query.

18. The computer-readable medium of claim 17, the method further comprising:
- analyzing the second database to find a third query in the query list; and
- reporting the third query to the user, wherein the reporting is based upon the analyzing of the second database to find the third query.

19. The computer-readable medium of claim 17, the method further comprising:
- ranking the second and third queries based upon the first loading on the first database of the first query as compared to a second loading on the first database of the second query;
- wherein reporting the second and third queries are in response to the ranking.

20. The computer-readable medium of claim 17, the method further comprising:
- determining the second loading based upon a second frequency of occurrence of the third query and upon a second duration of the third query;
- wherein ranking the second and third queries is in response to determining the first and second loading.

* * * * *